United States Patent Office 3,420,900
Patented Jan. 7, 1969

3,420,900
HALOGEN EXCHANGE PROCESS
Victor Mark, Ransomville, N.Y., assignor to Pennsalt Chemicals Corporation, Philadelphia, Pa., a corporation of Pennsylvania
No Drawing. Filed May 24, 1966, Ser. No. 552,441
U.S. Cl. 260—648    8 Claims
Int. Cl. C07c 17/20; C07c 23/02; C07c 23/18

ABSTRACT OF THE DISCLOSURE

A bromo-phosphorus compound of the formula $Z_2PBr$, where Z is chlorine, bromine, methyl or phenyl, is reacted with a halogenated hydrocarbon having at least one carbon to carbon double bond and a chloromethylene group or terminal chloromethyl group, so as to replace one of the chlorine atoms of said group with bromine. For example, hexachlorocyclopentadiene is converted to 5-bromopentachlorocyclopentadiene by reaction with $PBr_3$.

---

This application is a continuation of Ser. No. 293,262, filed July 8, 1963, and now abandoned.

This invention relates to a new method for the preparation of organic chlorobromo compounds by the selective replacement of a chlorine atom of a polychloro compound with a bromine atom. More specifically, this invention concerns a unique method for preparing monobromochlorocarbons, some of which are new compounds, which comprises reacting an unsaturated polychlorocarbon compound with a phosphorus bromide.

The desirability of exchanging a chlorine for a bromine is often encountered in organohalogen chemistry. While the replacement of isolated chlorines by bromine in properly activated positions, e.g., in benzylchlorides, is feasible and is a relatively simple process, no preparative method for the selective substitution of one of the chlorines in dichloromethylene or trichloromethyl groups by bromine is available in the literature. Strong Lewis acids, for instance, aluminum bromide and ferric bromide, have been used to effect a halogen exchange in polychloro compounds, but the reaction is nonselective, yielding a mixture of products, often non-separable into individual compounds.

The present invention describes not only a novel procedure for the replacement of chlorine with bromine, but it offers, at the same time, a method for the selective replacement by a bromine substituent of only one of the chlorines of a dichloromethylene or a trichloromethyl group of an unsaturated, halogenated hydrocarbon.

In accordance with this invention, a trivalent bromophosphorous compound, represented by the formula $Z_2PBr$, where Z is independently chlorine, bromine, methyl or phenyl, is reacted with a halogenated hydrocarbon, the halogen substituents on said hydrocarbon being chlorine, fluorine or bromine, said hydrocarbon having three to about twenty carbon atoms, at least one carbon to carbon double bond, and a chloromethylene (>CClX) or terminal chloromethyl (—$CCl_2X$) group (where X is hydrogen, chlorine or fluorine). Representative of said halogenated unsaturated hydrocarbons containing a chloromethylene or a terminal chloromethyl group are (a) the straight and branched chain halogenated hydrocarbons of the formula R=CX—$CCl_2X$, where X is as defined previously, and R is a divalent acyclic saturated or unsaturated hydrocarbon or halogenated hydrocarbon radical having one to about 18 carbon atoms; (b) aromatic compounds of the formula Ar—$CCl_2X$, where Ar is a hydrocarbon aryl or alkaryl radical, or halogenated aryl or alkaryl radical, having 6 to about 19 carbon atoms; and (c) halogenated cyclic hydrocarbon compounds having 3 to 12 carbon atoms and containing nonbenzenoid unsaturation wherein the carbon atom of the reactive chloromethylene group (>CClX) is a member of the cyclic ring.

Preferred chlorocarbons of the foregoing classes which are reacted with a phosphorous bromide according to this invention are:

hexachlorocyclopentadiene
hexachloropropylene
α,α-dichlorotoluene
α,α,α-trichlorotoluene
octachloro-1-vinylcyclopentadiene
octachloro-2-vinylcyclopentadiene
octachloro-1-methylcyclopentadiene
octachloro-2-methylcyclopentadiene
1,2,3,4,5-pentachlorocyclopentadiene
2,3,4,5,5-pentachlorocyclopentadiene
1,3,4,5,5-pentachlorocyclopentadiene
hexachlorocyclobutene
tetrachlorocyclopropene
octachloro-cis-2-butene
octachloro-trans-2-butene
octachloro-2,4-pentadiene
perchloro-2,4-hexadiene
α,α,α,α',α',α'-hexachloro-p-xylene
α,α,α,α',α',α'-hexachloro-m-xylene
α,α,α,α',α'-pentachloro-o-xylene
α,α,α-trichloro-1-methylnaphthalene
α,α,α,α',α',α'-hexachloro-1,4-dimethylnaphthalene
α,α,α',4-tetrachlorotoluene
α,α,α,2,4,6-hexachlorotoluene
α,α-dichloro-α-fluorotoluene
4-bromo-α,α-dichlorotoluene The bromine-chlorine exchange reaction embodied herein can be illustrated by the following generalized equations, showing phosphorous tribromide as the brominating agent for a polychloro compound $RCCl_2X$ where R is a monovalent, ethylenically unsaturated, hydrocarbon radical and where X is as defined earlier.

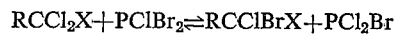
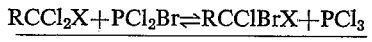

$RCCl_2X + PBr_3 \rightleftharpoons RCClBrX + PClBr_2$ $RCCl_2X + PClBr_2 \rightleftharpoons RCClBrX + PCl_2Br$ $RCCl_2X + PCl_2Br \rightleftharpoons RCClBrX + PCl_3$ Overall: $3RCCl_2X + PBr_3 \rightarrow 3RCClBrX + PCl_3$ It is seen above that the mono and dichlorophosphorous bromides are intermediate brominating agents during the course of the reaction, however, they also are effective brominating agents when used as starting material. Although inorganic, trivalent phosphorus bromides such as $PBr_3$, $PClBr_2$, $PCl_2Br$ and the like, are, for economic, manipulative and reactivity reasons, the preferred brominating reagents, the equivalent organic reagents, e.g., phenylphosphorous dibromide, $C_6H_5PBr_2$, diphenylphosphorous bromide, $(C_6H_5)_2PBr$, methylphosphorous bromide, $CH_3PBr_2$, and the like, give good results.

Although the reaction embodied therein takes place at room temperature and below, e.g., down to about −20° C., it is advantageous to heat the reactants in order to increase the rate of exchange. A second advantage of heating is facilitating the removal by distillation of the bromine-free phosphorus coproduct, e.g., phosphorous trichloride, thus encouraging the essentially equilibrium reaction to go to completion. The preferred reaction temperatures are within the range of about 80° C. to about 250° C. The practical upper limit of reaction temperature is largely determined by the boiling point of the chlorinated substrate and by the extent of side-reactions that occur at elevated temperatures; this limit is generally on the order of about 250 to about 300° C. In the preferred embodiment of the process, measures are taken to provide for the continuous removal of the chlorophosphorous coproduct in order to maintain the temperature of the reaction at a desired level and to obtain the added advantage of encouraging the equilibrium reaction to proceed in the forward direction. The combination of the use of superatmospheric pressures, e.g., up to 100 p.s.i., with the distillative removal of the chlorophosphorous coproduct, is, however, also feasible, as is the use of sub-atmospheric conditions in the case of the higher boiling phosphorous coproducts.

Solvents can be used to provide a homogeneous reaction mixture, although the phosphorous reactant itself, especially at higher temperatures, is an excellent solvent for most of the chlorocarbons. The choice of solvents is limited to those which do not react with either of the reactants under the conditions of the exchange reaction, and include, for example, aromatic halocarbons, such as mono and, dibromobenzenes, dichloro and trichlorobenzenes, halogenated biphenyls and diphenyl ethers. The use of solvents is, however, preferably avoided, in order not to reduce the rate of bromination of the chlorinated substrate.

The molar ratio of reactants used in the process is largely governed by the number of replaceable bromines in the phosphorous reactant, i.e., for every available bromine substituent of this reactant, one mole of the polychlorocarbon compound is preferably reacted therewith. An outstanding feature of the present process is the relative insensitivity of the exchange reaction to an excess of the brominating agent, the major result still being the replacement of only one of the chlorine atoms of the chlorocarbon with bromine. The high selectivity of the present method renders it especially suitable for use as a clean preparative procedure in synthetic organic chemistry. Moreover, the yields of the brominated product are comparatively high, ranging from about 20 to about 70%.

Following the completion of the reaction herein described, the brominated organic product can be recovered from the reaction mixture by several of the conventional isolation techniques, for example, distillation, crystallization, elution chromatography, steam distillation and combinations thereof. In one of the preferred methods of work-up, the relatively low-boiling phosphorous compounds are removed by distillation (completed eventually by stripping in vacuum), followed by steam-distillation of the residue to remove the brominated organic product and unreacted starting material from any decomposition products or byproducts of higher molecular weights that might have been formed. Fractional distillation alone can also be used to separate all of the products into individual entities, inasmuch as there are no product position isomers having close boiling points because of the selectivity of the bromination as discussed earlier.

The bromochlorocarbon products prepared in accordance with the present invention are in themselves useful as pesticides and as intermediates for preparing insecticides. The products are also useful as polyolefin curing agents and as comonomers in the preparation of polymers with such co-monomers as maleic anhydride, 2-butene-1,4-diol and acetylenedicarboxylic acid to provide polymers having self-extinguishing characteristics when exposed to fire.

The following examples, which are illustrative of the process of the present invention and the utility of compounds produced thereby, are presented for the purpose of clarifying the description and are not to be taken as limitative of the scope of the invention.

Example 1.—Preparation of 5-bromopentachlorocyclopentadiene

A mixture of phosphorous tribromide (135.4 g., 0.5 mole) and hexachlorocyclopentadiene (409.2 g., 1.5 moles) was charged to a one-liter, three-neck flask provided with a stirrer and a distillation head with a reflux condenser. The top of the reflux condenser was connected to a drying tube, and the take-off tube of the distillation head was connected to a tared 100 ml. two-neck flask which also was protected by a drying tube. The contents of the reaction flask were heated and so controlled that the temperature of the liquid reached 160° C. in about 3–4 hours, and thereafter, it was maintained between 160 and 170° C. during the run. After 6–8 hours at this temperature, red droplets started to collect in the distillation head, the amount of which gradually increased, and in another one-hour period formed a slow, but regular reflux. Removal of the condensed liquid began while care was taken to maintain the head temperature between 70 and 80° C., that is, corresponding approximately to the boiling point of $PCl_3$ (75.8°). During another 6 to 7 hours period, the collected red liquid amounted to 76 gms. Its color and weight (theory for $PCl_3$ recovery was 68.7 g.) and the presence of a small amount of orange crystals indicated the formation of some elemental bromine, the combination of which with the trivalent phosphorous halides accounted for the formation and sublimation of some solids in the distillate.

The contents of the reaction flask, an orange-red oil weighing 460.8 g., was fractionally distilled in vacuum to yield unreacted hexachlorocyclopentadiene (B.P. 33.5–34.5° C. at 0.04 mm. Hg, 179 g., 0.655 mole), and 5-bromopentachlorocyclopentadiene (B.P. 43–44° C. at 0.04 mm. Hg, 104.5 g., 0.330 mole). The conversion of hexachlorocyclopentadiene to its 5-bromo analog according to the reaction

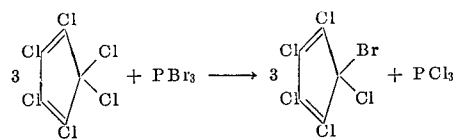

was 22.0%, the yield 39%. Other products were high boiling condensation products of hexachlorocyclopentadiene and bromopentachlorocyclopentadiene. Significantly, there was no isometric bromopentachlorocyclopentadiene or any of the higher brominated cyclopentadienes present among the reaction products.

The identity of 5-bromopentachlorocyclopentadiene was established (in addition to measuring its boiling point given above) by elemental and spectral analyses.

Elemental analysis of $C_5BrCl_5$; mol. wt. 317.2. Theory: C, 18.9; Br, 25.2; Cl, 55.9%. Found: C, 19.0; Br, 25.3; Cl, 55.9%.

The infrared spectrum of $C_5BrCl_5$ is very similar to that of $C_5Cl_6$, although it is readily recognized by bands at 530 (m.), 621 (w.), 666 (s.) and 776 (s.) cm.$^{-1}$, which are absent in hexachlorocyclopentadiene. Several of the remaining infrared maxima of $C_5BrCl_5$ are slightly shifted with respect to those of $C_5Cl_6$.

Example 2.—Preparation of 3-bromopentachloropropylene

Using the procedure of Example 1, 373.2 g. (1.5 moles) of hexachloropropylene was reacted with 0.5 mole of $PBr_3$. In order to facilitate the removal of all of the phosphorous co- and by-products in the workup, the reaction mixture was poured into and extracted with water after completion of the heating period. Fractional distillation of the red liquid product yielded unreacted hexachloropropylene (B.P. 35° C. at 0.15 mm.,) and 3-bromopentachloropropylene (B.P. 36° C. at 0.04 mm.). The conversion of $C_3Cl_6$ to $C_3BrCl_5$ was 20.0%, the yield being 39.6% of the theoretical recovery according to the reaction

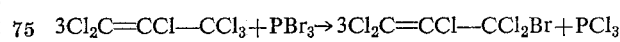

The new bromochlorocarbon was identified by elemental and spectral analyses:

Elemental analysis of $C_3BrCl_5$; mol. wt. 293.2. Theory: C, 12.3; Br, 27.2; Cl, 60.5%. Found: C, 12.4; Br. 27.0; Cl, 60.8%.

The infrared spectrum of $C_3BrCl_5$ is very similar to that of $C_3Cl_6$, except for the presence of diagnostic new bands at 610 (m.), 630 (m.), 721 (s.), 825 (w.) and 906 (m.) cm.$^{-1}$.

The high selectivity of the present bromination procedure was again underlined by the absence of any of the isomeric bromopentachloropropylenes or any of the higher brominated polychloropropylenes among the reaction products, as determined by distillation procedures and by infrared analyses.

Example 3.—Preparation of α-bromo-α, α-dichlorotoleune

Repeating the procedure of Example 1 with benzotrichloride (α,α,α-trichlorotoluene) as starting material yielded, after water treatment and fractionation, unreacted starting material (B.P. 33° C. at 0.01 mm.), and α-bromo-α,α-dichlorotoluene (B.P. 38° C. at 0.01 mm.). The conversion to the bromo compound was 23% and yield 65% in accordance with the reaction:

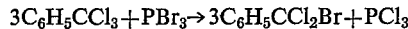
$$3C_6H_5CCl_3 + PBr_3 \rightarrow 3C_6H_5CCl_2Br + PCl_3$$

Example 4.—Preparation of α-bromo-α-chlorotoluene

Reacting benzalchloride (α,α-dichlorotoluene) with $PBr_3$ according to the general procedure of Example 1 gave the product α-bromo-α-chlorotoluene (B.P. 31.5° C. at 0.15 mm.). The conversion was 47.2% and the yield 67% in accordance with the reaction:

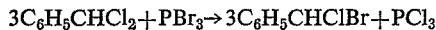
$$3C_6H_5CHCl_2 + PBr_3 \rightarrow 3C_6H_5CHClBr + PCl_3$$

Example 5.—Preparation of 9-bromo-1,2,3,4,9-pentachloro - 1,4,4a,5,8a - hexahydro - 1,4,5,8 - dimethanonaphthalene An equimolar mixture of 5-bromopentachlorocyclopentadiene, prepared as described in Example 1, (19.4 g., 0.061 mole) and norbornadiene (5.62 g., 0.61 mole) was heated gradually up to 110° C. in a period of 5 hours. Work-up of the product by recrystallization from methanol yielded the product in the form of white crystals, M.P. 102–104° C. The conversion was 44% according to the reaction:

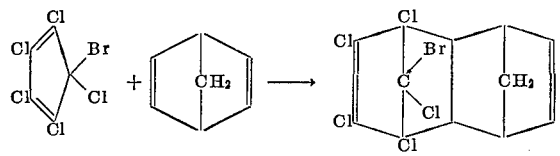

Elemental analysis, which confirmed the composition of this new Diels-Alder adduct, was as follows:

Calculated for $C_{12}H_8BrCl_5$: C, 35.2; H, 2.0; Br, 19.6; Cl, 43.4%; mol. wt., 409.3. Found: C, 35.4; H, 2.0; Br, 19.6; Cl, 44.1%; mol. wt., 410.

When tested against insects, the new bromochlorocarbon was found to be remarkably superior to the hexachloro analog ("Aldrin"). In comparative tests against flies, for example, the bromine-containing adduct at 0.8 p.p.m. concentration gave 100% kill, whereas a highly purified sample of the commercial insecticide "Aldrin" gave 50% kill at the same concentration under the same test conditions.

I claim:
1. A method which comprises reacting a bromo-phosphorous compound having the formula $Z_2PBr$ where Z is independently selected from the group consisting of chlorine, bromine, methyl and phenyl, with a halogenated hydrocarbon, the halogen substituents on said hydrocarbon being selected from the group consisting of fluorine, chlorine, and bromine, said hydrocarbon having three to about twenty carbon atoms, at least one carbon to carbon double bond, and a chlorinated group selected from the class consisting of chloromethylene having the structure >CCIX and a terminal chloromethyl having the structure—$CCl_2X$ where X is selected from the group consisting of hydrogen, chlorine and fluorine, whereby one of the chlorine atoms of said chlorinated group is replaced by bromine.
2. The method of claim 1 wherein the bromo-phosphorous compound is $PBr_3$.
3. The method of claim 1 wherein the halogenated hydrocarbon is selected from the group consisting of (a) straight and branched chain halogenated hydrocarbons having the formula $R=CX—CCl_2X$ where R is selected from the group consisting of acylic saturated and unsaturated hydrocarbon and halogenated hydrocarbon radicals having from one to about 18 carbon atoms; (b) aromatic compounds of the formula Ar—$CCl_2X$ where Ar is a radical selected from the class consisting of hydrocarbon aryl and alkaryl and halogenated aryl and alkaryl having from six to about 19 carbon atoms; and (c) halogenated hydrocarbon cyclic compounds having 3 to 12 carbon atoms, containing nonbenzenoid unsaturation and a chloromethylene group >CCIX which is a member of the cyclic ring.
4. The method of claim 3 wherein the bromo-phosphorous compound is $PBr_3$.
5. The method of claim 1 wherein the halogenated hydrocarbon is hexachloropropylene.
6. The method of claim 1 wherein the halogenated hydrocarbon is hexachlorocyclopentadiene.
7. The method of claim 1 wherein the halogenated hydrocarbon is α,α-dichlorotoluene.
8. The method of claim 1 wherein the halogenated hydrocarbon is α,α,α-trichlorotoluene.

References Cited

UNITED STATES PATENTS
2,553,518   5/1951   Lake et al. ———————— 260—658

FOREIGN PATENTS
493,270   5/1953   Canada.

OTHER REFERENCES
Forbes et al.: "J. Am. Chem. Soc." vol. 66, pp. 931–3 (1944).

LEON ZITVER, *Primary Examiner.*

M. JACOB, *Assistant Examiner.*

U.S. Cl. X.R.

260—651, 654, 658, 78.5, 80.3, 91.3, 91.5, 91.7, 999

UNITED STATES PATENT OFFICE
CERTIFICATE OF CORRECTION

Patent No. 3,420,900                                                           January 7, 1969

Victor Mark

It is certified that error appears in the above identified patent and that said Letters Patent are hereby corrected as shown below:

Column 1, lines 23 and 24, cancel "This application is a continuation of Ser. No. 293,262, filed July 8, 1963, and now abandoned.". Column 5, line 16, "dichlorotoleune" should read -- dichlorotoluene --.

Signed and sealed this 17th day of March 1970.

(SEAL)
Attest:

Edward M. Fletcher, Jr.                                    WILLIAM E. SCHUYLER, JR.

Attesting Officer                                                           Commissioner of Patents